United States Patent
Yang et al.

(10) Patent No.: US 7,626,678 B2
(45) Date of Patent: *Dec. 1, 2009

(54) REPAIRING METHOD FOR A LIQUID CRYSTAL DISPLAY PANEL

(75) Inventors: Kei-Hsiung Yang, Tao-Yuan Hsien (TW); Jiunn-Shyong Lin, Tao-Yuan Hsien (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 304 days.

This patent is subject to a terminal disclaimer.

(21) Appl. No.: 11/775,219

(22) Filed: Jul. 9, 2007

(65) Prior Publication Data

US 2008/0013035 A1   Jan. 17, 2008

Related U.S. Application Data

(63) Continuation-in-part of application No. 10/711,035, filed on Aug. 19, 2004, now Pat. No. 7,256,862.

(30) Foreign Application Priority Data

Jun. 10, 2004   (TW) .............................. 93116726 A

(51) Int. Cl.
  G02F 1/13       (2006.01)
  G02F 1/1339    (2006.01)
  G02F 1/1341    (2006.01)
(52) U.S. Cl. ................... 349/192; 349/190; 349/189; 349/154

(58) Field of Classification Search ............. 349/192, 349/190
See application file for complete search history.

(56) References Cited

U.S. PATENT DOCUMENTS

| | | | |
|---|---|---|---|
| 6,844,910 B2 * | 1/2005 | Katsura | 349/189 |
| 7,086,175 B2 | 8/2006 | Sasaki et al. | |
| 2002/0033926 A1 | 3/2002 | Nakahara et al. | |
| 2004/0257521 A1 * | 12/2004 | Murouchi et al. | 349/189 |
| 2004/0263767 A1 | 12/2004 | Wang et al. | |
| 2005/0057716 A1 | 3/2005 | Hou et al. | |
| 2006/0164590 A1 * | 7/2006 | Liu et al. | 349/190 |

* cited by examiner

Primary Examiner—David Nelms
Assistant Examiner—W. Patty Chen
(74) Attorney, Agent, or Firm—Winston Hsu

(57) ABSTRACT

A repairing method of a liquid crystal display panel having a gravity defect includes steps of providing a first pressure to the liquid crystal display panel. Next, a second pressure is continuously provided to the liquid crystal display panel, and a section from the edge of the liquid crystal panel to the sealant is removed and forming an opening through the closed sealant frame. Then, forcing out the excess liquid crystal to flow out the panel through the cut off sections, cleaning out the excess material including LC mixture around the opening, and sealing the opening with a fresh end sealant. After that, providing a third pressure to the liquid crystal display panel, curing the end sealant to seal the opening, and then removing the third pressure. Finally, annealing the liquid crystal display panel to recover original display quality.

21 Claims, 2 Drawing Sheets

REPAIRING METHOD FOR A LIQUID CRYSTAL DISPLAY PANEL

RELATED APPLICATIONS

This is a continuation in part of U.S. application Ser. No. 10/711,035, filed Aug. 19, 2004.

BACKGROUND OF THE INVENTION

1. Field of the Invention

The invention relates to a repairing method for a liquid crystal display panel, and more particularly, to a method for repairing an uneven defect on a liquid crystal display panel caused by a gravity issue.

2. Description of the Related Art

Since the progress of science and technology has led to small, effective, and portable intelligent information products, display devices have played an important role in modern society. In recent years, display devices have undergone great improvements in the areas of high performance, quality, larger size, and lower cost. TFT-LCDs have characteristics of thinness, lightness, and low power consumption, hence having the most chance to have a large market in the future as a display device to replace CRTs. Therefore, the large TFT-LCD panels used for television (TV) are popularized such as from 23" to more than 100" in diagonal size.

Generally, the liquid crystal display panel is erectly placed, hence the gravity will change the internal pressure balance around the bottom of the liquid crystal display panel, and will induce a visible defect, called gravity mura. And, the larger size of the liquid crystal display panels will have more chance to cause the gravity mura around the bottom of liquid crystal cavity within the liquid crystal display panel. Please refer to FIG. 1, which is a schematic diagram of an erectly placed liquid crystal display panel according to the prior art. The liquid crystal display panel 100 has two glass substrates 10 and 12, and the liquid crystal 16 is filled between the glass substrates 10 and 12 and is encapsulated by a closed sealant frame 14. When the liquid crystal display panel 100 is erectly placed, three kinds of forces, which are shown as F 1, F 2, and F 3 in FIG. 1, are exerted onto the bottom region 18 of the liquid crystal display panel 100. The arrows indicate the directions of F 1, F 2, and F 3.

The first force F 1 is caused by a pressure difference between the liquid crystal 16 in the liquid crystal display panel 100 and the outside environment. We can describe F 1 as following equation:

$$F1 = \Delta P$$

The second force F 2 is caused by the capillarity of the liquid crystal 16, and can be described as following equation:

$$F2 = S \cdot \cos\theta / d$$

Where S is the surface tension of the LC medium inside the cavity, $\theta$ is the contact angle between the LC medium in cavity and the substrates of the panel, and d is the cell gap of the panel.

The third force F 3 is caused by the gravity of the liquid crystal. Defining the z-axis as zero at the top of the LC cavity of the TFT-LCD panel, and pointing downward as shown in FIG. 1. If bottom region 18 has a height of h along the z-axis from the top of the LC cavity of the TFT-LCD panel, then, F 3 can be described as following equation:

$$F3 = \rho \cdot g \cdot h$$

Where the $\rho$ is the density of the liquid crystal medium within the LC cavity, g is the gravity constant on the earth surface, and h is the height of the bottom region 18.

At any given temperature, gravity mura won't occur at bottom region 18 under the condition, that is $$F1 + F2 \geq F3$$

Hence, $\Delta P + S \cdot \cos\theta / d \geq \rho \cdot g \cdot h$

When the sum of the pulling forces F 1 and F 2 is larger than or equal to the pushing force of F 3, the liquid crystal 16 in the liquid crystal display panel 100 is in a pressure balanced condition, and the images can be normally displayed. If the sum of the pulling forces F 1 and F 2 is smaller than the pushing force of F 3, a gravity mura will happen at the bottom region 18 of the erectly placed liquid crystal display panel 100, and the image quality at the location of gravity mura is degraded.

BRIEF SUMMARY OF THE INVENTION

It is therefore one of the objective of the present invention to provide a repairing method for a liquid crystal display panel having a gravity defect, so that the unqualified products can be easily repaired.

According to the present invention, a repairing method for a liquid crystal display panel is disclosed. The repairing method includes steps of continuously providing a first pressure to the opposite surfaces of the liquid crystal display panel using a clamping apparatus. The clamping apparatus can be plates or air springs (air bags), and maintain the temperature in 20 to 70° C. Next, a second pressure is continuously provided to the opposite surfaces of the liquid crystal display panel, and utilized a mechanic cutter or a laser cutter cutting a T-shape section 230 in the edge of the liquid crystal display panel and forming an opening 228 through the closed sealant frame. Then, steps of pressing out the liquid crystal through the opening, cleaning and sealing the opening 228 with a fresh sealant are sequentially processed. The temperature is still maintained from 20 to 70° C. when the second pressure is applied to the opposite surfaces of the liquid crystal display panel. After that, the third pressure is continuously provided to the liquid crystal display panel, and the fresh end sealant is cured to become hardness. The temperature is maintained from 20 to 70° C. when the third pressure is applied to the opposite surfaces of the liquid crystal display panel. Finally, the steps of removing the third pressure and annealing the liquid crystal display panel at approximately 120° C. to improve the liquid crystal alignment for better display qualities are sequentially processed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
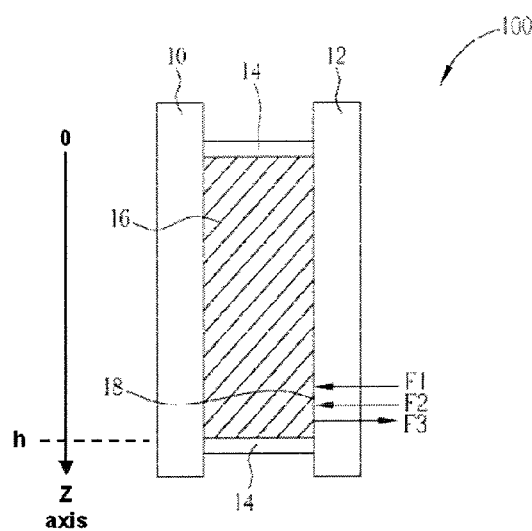
FIG. 1 is a schematic diagram of an erectly placed liquid crystal display panel according to the prior art.
Figure 2:
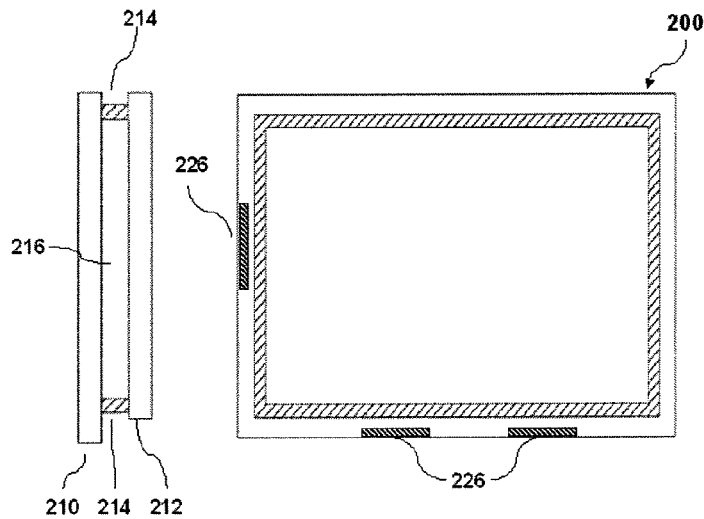
FIGS. 2 to 5 are schematic diagrams showing a repairing method according to the present invention.

The following description is made for the purpose of illustrating the general principles of the invention and should not be taken in a limiting sense. The scope of the invention is best determined by reference to the appended claims.

Following the populated of TFT-LCD in television (TV) application, the large size of TFT-LCD panels that from 23" to over 100" in diagonal size are massively manufactured. However, the larger size of TFT-LCD panels will have more chance to cause the gravity mura at the bottom region of LCD. Furthermore, if there are some the ill-controlled cell parameters, manufacture process, or air leakage into the panel as the panel ages, the gravity mura will occur. Therefore, the invention is related to repairing method and procedures for the gravity mura in TFT-LCD panels, specially to repairing the panels which manufactured from One-Drop Fill (ODF) method.

Please refer to FIGS. 2 to 5, which are schematic diagrams showing a repairing method according to the present invention. The present invention of repairing procedures is used to eliminate gravity mura in TFT-LCD panels assembled by One-Drop-Fill (ODF) method. Please refer to FIG. 2, which is a schematic diagram of the liquid crystal display panel 200 manufactured by using the ODF method. The liquid crystal display panel 200 has the first glass substrates 210 and the second glass substrate 212. Liquid crystal 216 is filled in the region between the first and the second glass substrates 210 and 212 and is encapsulated with a closed sealant frame 214. Since the One-Drop Fill (ODF) manufacturing method is different from the conventional LC injection manufacturing method, the liquid crystal display panel 200 has no liquid crystal injection hole. When repairing the liquid crystal display panel 200, specialized procedures are required.

The lower and left sides of the liquid crystal display panel 200 have metal layout pads on the first glass substrates 210 to be connected to outside IC drivers 226. These two sections can't be damaged or may cause abnormal image in liquid crystal display panel 200. There are still few sections on the top and right sides of the liquid crystal display panel 200 from the closed sealant frame to glass edge, which are chosen to cut away in the present method.

Figure 3:
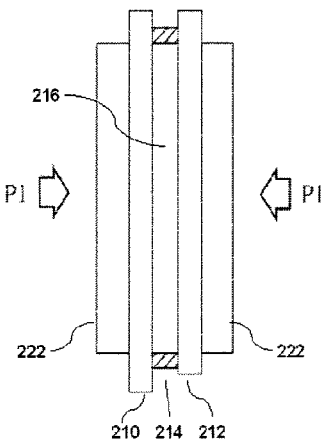

The present method continuously provides a first applied pressure P 1 to two opposite surfaces of the liquid crystal display panel 200, and maintain temperature from 20 to 70° C., as shown in FIG. 3. When providing the first applied pressure P 1, two clamping apparatus 222 are placed at two sides for pressing the liquid crystal display panel 200. The clamping apparatus 222 can be plates or air springs (air bags).

Figure 4:
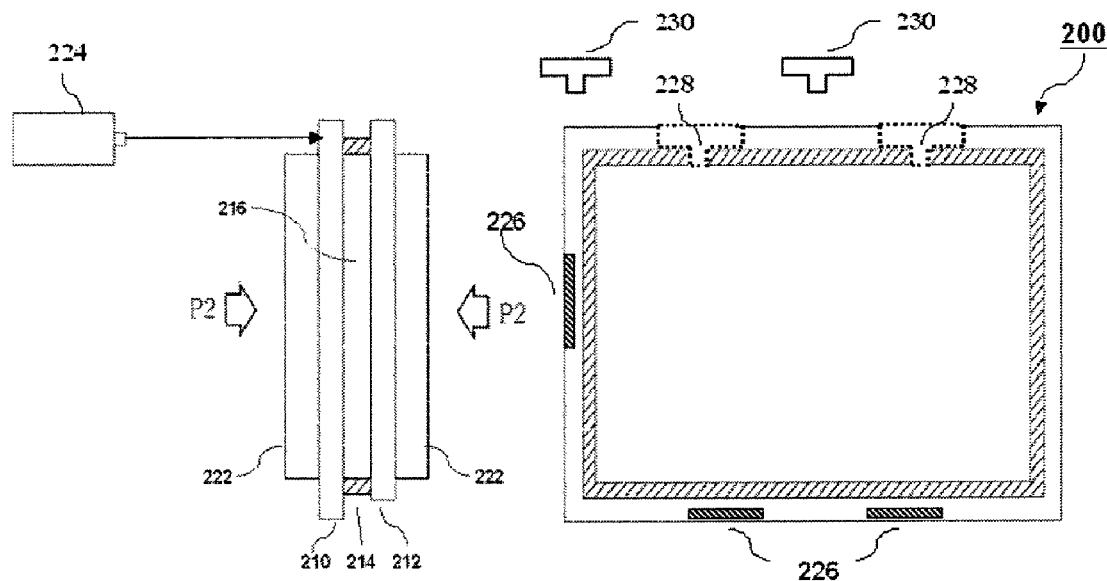

As showing in FIG. 4, a second applied pressure P 2 is continuously provided to two opposite surfaces of the liquid crystal display panel 200 via the clamping apparatus 222 and a laser 224 is used to remove few T-shape sections 230 from the edge containing a length larger than about 0.5 centimeter of liquid crystal display panel into the closed sealant frame 214. Moreover, the cut off T-shape sections 230 from the edge of liquid crystal display panel are either on the first glass substrate 210 side or on the second glass substrate 212 side or both, respectively. The magnitude of the second applied pressure P 2 can be larger than or same as the first applied pressure P 1, and the applied pressure P 2 is sufficient to force out the excess LC mixture inside the panel to flow out through the opening 228 on the edge of the liquid crystal display panel. The laser 224 can remove either or both of the two glasses substrates 210 and 212 and the closed sealant frame 214. Moreover, the second applied pressure P 2 can prevent air from getting into the gap between two glass substrates 210 and 212. Furthermore, the temperature of the liquid crystal display panel 200 is maintained at 20° C. to 70° C. to keep the liquid crystal 216 in the large-capacity status. This process of flowing out excess liquid crystal may cost from 0.1 to 10 hours depending on panel sizes, the total length of cut off main-seal sections and temperatures.

Please refer to FIG. 4, cleaning the excess material including liquid crystal 216 around the opening 228 when the panel is under the pressure P 2 which continually provided to the two opposite surfaces of the liquid crystal display panel 200.

Figure 5:
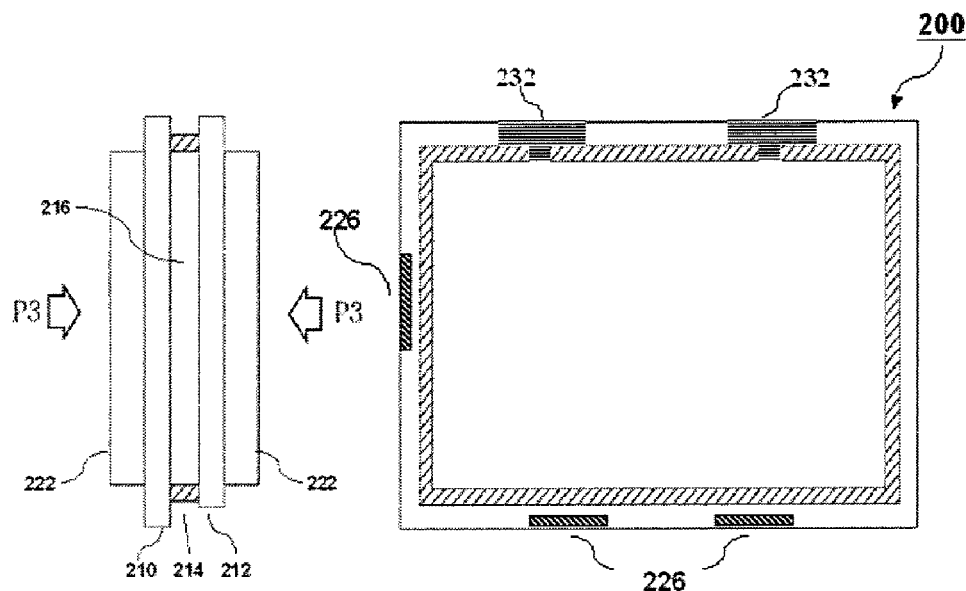

Please refer to FIG. 5, after cleaning the excess liquid crystal material around the opening 228, a fresh end sealant 232 is used to re-seal the opening 228 on the edge of the liquid crystal display panel 200. The closed sealant frame can be an ultraviolet sensitive material. Therefore, over-coating a fresh end sealant 232 surrounding the cut off main seal sections, and then change the applied pressure from P 2 to P 3. The magnitude of the applied pressure P 3 is usually smaller than applied pressure P 2. Therefore the relationship between the P 1, P 2 and P 3 can be describe as blow equation:

$$P\,1 \leq P\,2 \text{ and } P\,2 > P\,3$$

The magnitude of the applied pressure P 1, P 2, and P 3 are between 0.4 kgf/cm² and 1.2 kgf/cm², that is, $$0.4\text{ kgf/cm}^2 < (P\,1, P\,2, P\,3) < 1.2\text{ kgf/cm}^2$$

After coating the fresh end sealant 232 surrounding the opening 228, a curing process is performed to harden the end sealant 232 when the panel is under the third applied pressure P 3 which provided to the opposite surface of the liquid crystal panel 200. After the closed sealant frame becomes hardness, the repairing procedures are finished. And then the provided applied pressure is reduced from P 3 to ambient-air pressure.

Finally, the anneal process will produce on the repaired panel under the temperature at approximately 120° C. for better LC alignment.

After these procedures, the weight of the liquid crystal 216 in the liquid crystal display panel 200 will be reduced, and the gravity mura will be also repaired. The first, second, and third pressures are defined in accordance with the sequence when performing the repairing method, and not indicative of the relative strengths. The relationship of these three pressures is concluded as: the second pressure P 2 is a little larger than or same as the first pressure P 1, the third pressure P 3 is smaller than the second pressure P 2.

In contrast to the prior art, the present invention can reduce weight of the liquid crystal in the liquid crystal display panel, so that the gravity mura can be effectively repaired.

Those skilled in the art will readily observe that numerous modifications and alterations of the device may be made while retaining the teachings of the present invention. Accordingly, the above disclosure should be construed as limited only by the metes and bounds of the appended claims.

What is claimed is:

1. A repairing method for a liquid crystal display panel having a pair of substrates, a closed sealant frame, and liquid crystal filled between the substrates and encapsulated by the closed sealant frame, comprising steps of:

removing a section from the edge of the liquid crystal display panel, and the section having a part of the closed sealant frame;

forming an opening through the closed sealant;

annealing the liquid crystal display panel from 10 minutes to 2 hours;

discharging an excess liquid crystal of the liquid crystal through the opening; and sealing the opening with a fresh end sealant.

2. The repairing method of claim 1, further comprises cleaning down an area around the opening.

3. The repairing method of claim 1, further comprises curing the fresh end sealant.

4. The repairing method of claim 1, wherein the end sealant is an ultraviolet sensitive material.

5. The repairing method of claim 1, further comprises continuously providing a pressure to the outer surfaces of the substrates.

6. The repairing method of claim 5, wherein the magnitude of the pressure is between 0.4 kgf/cm$^2$ and 1.2 kgf/cm$^2$.

7. The repairing method of claim 5, further comprises increasing the magnitude of the pressure.

8. The repairing method of claim 5, further comprises decreasing the magnitude of the pressure.

9. The repairing method of claim 5, further comprises removing the pressure to the outer surfaces of the substrates.

10. The repairing method of claim 5, further comprises providing a clamping apparatus for continuously providing the pressure.

11. The repairing method of claim 10, wherein the clamping apparatus is a pair of flat plates, air springs, or air bags.

12. The repairing method of claim 1, wherein the liquid crystal display panel is annealed at approximately 120° C.

13. The repairing method of claim 1, further comprises maintaining a temperature from 20 to 70° C.

14. The repairing method of claim 1, wherein the section is a T-shape section.

15. The repairing method of claim 1, wherein the section is removed by a mechanical cutter of a laser cutter.

16. The repairing method of claim 1, wherein the section further has a part of the substrates.

17. The repairing method of claim 1, wherein the liquid crystal display panel is filled with the liquid crystal utilizing a One-Drop-Fill method.

18. The repairing method of claim 1, wherein the process of discharging an excess liquid crystal cost from 0.1 to 10 hours.

19. The repairing method of claim 1, wherein the opening and a drive IC are located in different side of the liquid crystal panel.

20. A repairing method for a liquid crystal display panel having a pair of substrates, a closed sealant frame, and liquid crystal filled between the substrates and encapsulated by the closed sealant frame, comprising steps of:

removing a section from the edge of the liquid crystal display panel, and the section having a part of the closed sealant frame;

forming an opening through the closed sealant;

annealing the liquid crystal display panel at approximately 120° C.;

discharging an excess liquid crystal of the liquid crystal through the opening; and sealing the opening with a fresh end sealant.

21. A repairing method for a liquid crystal display panel having a pair of substrates, a closed sealant frame, and liquid crystal filled between the substrates and encapsulated by the closed sealant frame, comprising steps of:

removing a section from the edge of the liquid crystal display panel, and the section being a T-shape section and having a part of the closed sealant frame;

forming an opening through the closed sealant;

discharging an excess liquid crystal of the liquid crystal through the opening; and sealing the opening with a fresh end sealant.

* * * * *